United States Patent [19]

Pryor

[11] Patent Number: 4,761,072
[45] Date of Patent: Aug. 2, 1988

[54] ELECTRO-OPTICAL SENSORS FOR MANUAL CONTROL

[75] Inventor: Timothy R. Pryor, Tecumseh, Canada

[73] Assignee: Diffracto Ltd., Ontario, Canada

[21] Appl. No.: 110,589

[22] Filed: Oct. 19, 1987

Related U.S. Application Data

[63] Continuation of Ser. No. 913,641, Sep. 30, 1986, abandoned, which is a continuation of Ser. No. 657,262, Oct. 3, 1984, abandoned.

[51] Int. Cl.⁴ .............................................. G01C 3/00
[52] U.S. Cl. ...................................... 356/1; 354/403; 356/4; 356/5
[58] Field of Search .................... 356/1, 4, 5, 372, 376

[56] References Cited

U.S. PATENT DOCUMENTS

| | | | |
|---|---|---|---|
| 4,371,245 | 2/1983 | Iwata et al. | 354/401 |
| 4,373,804 | 2/1983 | Pryor et al. | 356/1 |
| 4,538,907 | 9/1985 | Rocci | 356/1 |
| 4,601,574 | 7/1986 | Yamane et al. | 356/1 |

Primary Examiner—L. T. Hix
Assistant Examiner—D. Rutledge
Attorney, Agent, or Firm—Larson and Taylor

[57] ABSTRACT

Novel method and apparatus are disclosed which assist in utilization of ranging type non-contact sensors with coordinate measurement machines (CMM's) and other machines. Various visual and/or audible indicators are provided to assist the operator in using the machine.

16 Claims, 3 Drawing Sheets

ELECTRO-OPTICAL SENSORS FOR MANUAL CONTROL

This application is a continuation of application Ser. No. 913,641 filed Sept. 30, 1986, now abandoned, which is a continuation of application Ser. No. 657,262, filed Oct. 3, 1984, now abandoned.

BACKGROUND

Referenced in this application are:
1. U.S. Pat. No. 4,373,804;
2. Copending application by the inventor entitled "Robotic Inspection Improvements", Ser. No. 657,260 filed Oct. 3, 1984;
3. Copending application entitled "Triangulation Data Integrity", Ser. No. 657,261 filed Oct. 3, 1984; and
4. Copending application Ser. No. 207,081, now U.S. Pat. No. 4,453,082.
the disclosures of which are herein incorporated by reference.

Triangulation based optical sensors described in the above references are very useful for the measurement of contoured dimensions on parts such as sheet metal, body panels and the like. Such sensors usually have an operable range, for example say 10 mm over which they can obtain accurate distance data (say to 0.01 mm) from a standoff to a surface of say 50 mm.

When used in a manually positioned mode, these sensors can however have certain disadvantages. First, many are constructed with infra-red light sources whose spots, lines or other zones projected on the part cannot be seen directly by the operator.

Second, even when visible sources are used, the range of the part to the sensor is not often indicated except by looking at a display which can be difficult for the operator to use. In addition, it is difficult for the operator to known when he is within the range of the sensor to take valid data since all such sensors have limited ranges over which they are effective, eg. 10 mm in the above example, or even up to 25 mm where lesser resolution is provided.

For this reason, the invention discloses several techniques including both visual and aural for obviating these difficulties and providing workable manual mode sensor operation. While generally of most use with optical sensors, many of the techniques disclosed herein can be used with other non-contact ranging sensors such as ultrasonic, inductive, etc. Furthermore, use is not limited to coordinate measurement machines but can be used for machines in general such as milling machines. In addition, the disclosed ideas are of use on automatically servoed measuring machines to keep the operator informed and are not limited only to manual operation.

The invention is illustrated in the following embodiment:

Figure 2A:
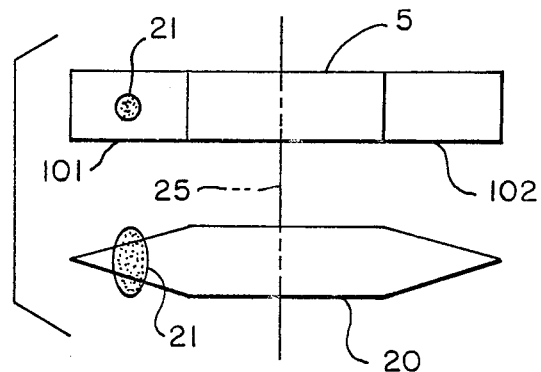
FIG. 2a is a schematic view of two reference detectors according to the present invention.
Figure 2B:
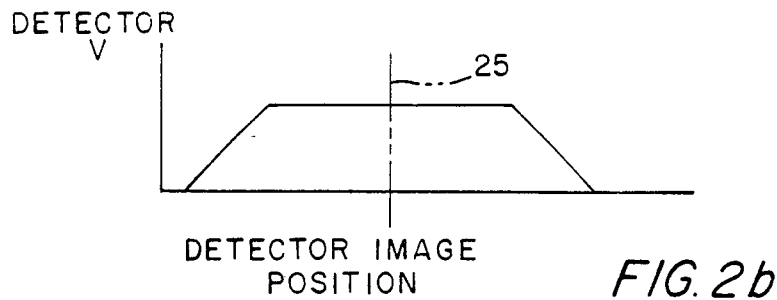
Figure 2E:
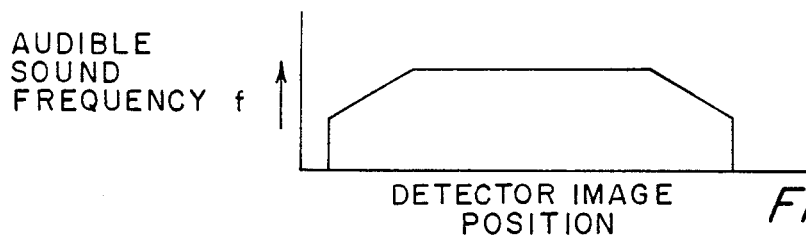
Figure 2C:
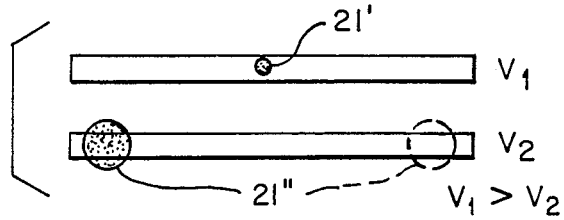
Figure 2D:
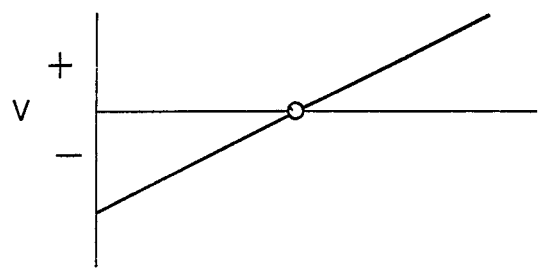

FIG. 2b, 2d, and 2e are graphical representations of outputs of detectors according to the present invention.

FIG. 2c is a schematic representation of zone image focus on a detector.

Figure 3:
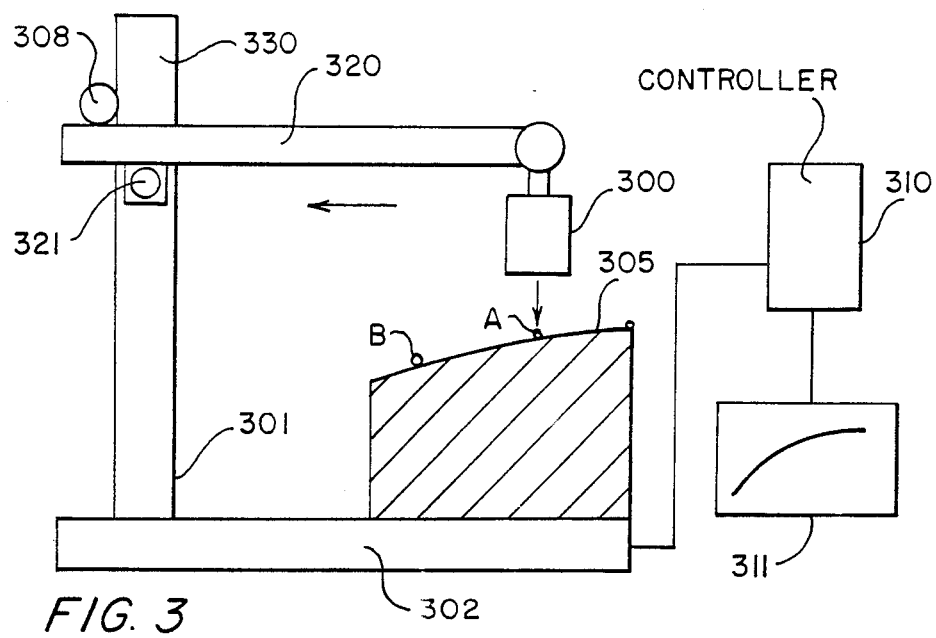

FIG. 3 is a schematic plan view of a semi-automatic embodiment of the present invention.

Figure 4A:
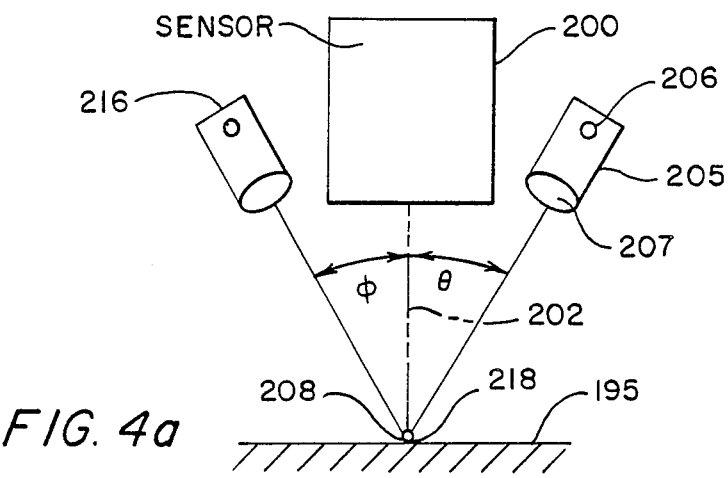

FIG. 4a is a schematic plan view of a twin beam projection embodiment of the present invention.

Figure 4C:
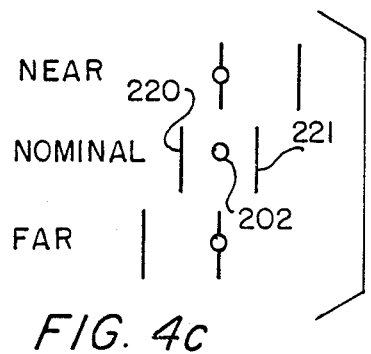
Figure 4B:

FIG. 4b and 4c are schematic representations of two range determination methods of the present invention.

Figure 1:
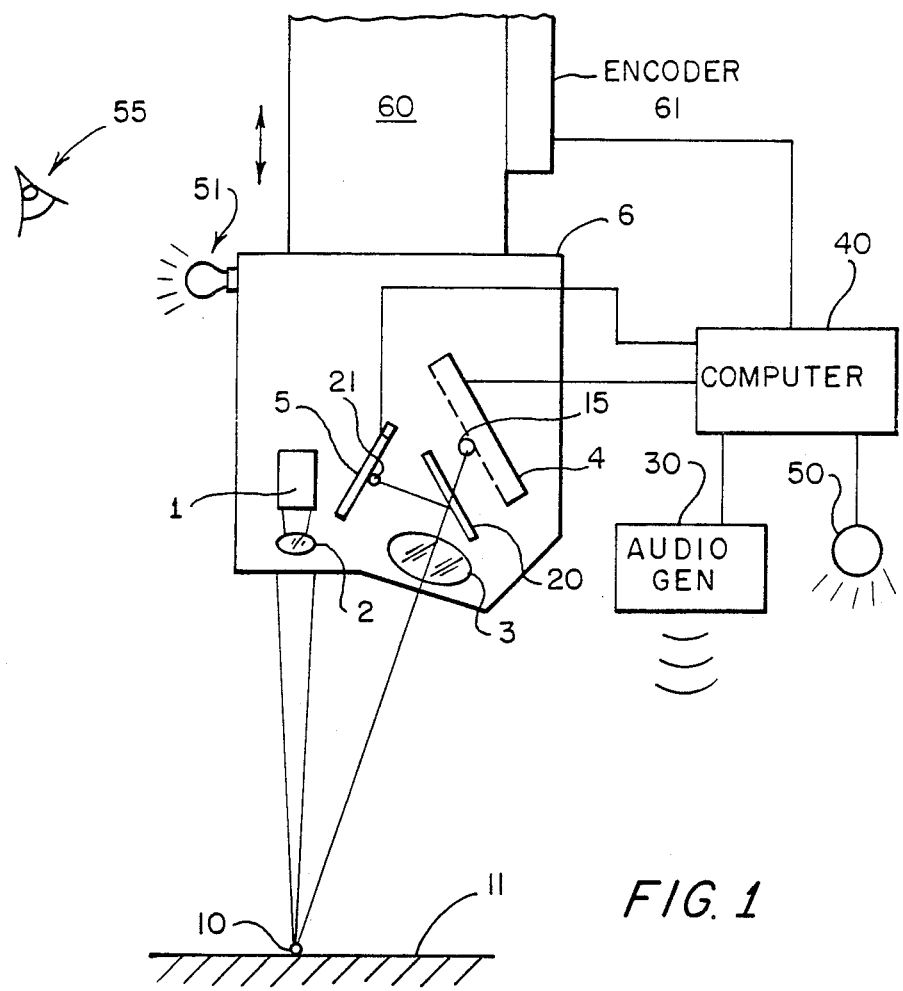
FIG. 1 is a schematic elevation view of a basic triangulation sensor based embodiment of the present invention.

FIG. 1 for example illustrates a basic triangulation sensor using an infra-red light source such as diode laser 1, focusing lens 2, imaging lens 3, scanning photodetector array 4 and reference detector 5 in housing 6. A zone of light such as spot 10 is formed on part surface 11 and imaged by lens 3 to form a spot image 15 on array 4 and, via beam splitter 20, spot image 21 on reference detector 5.

Optional audible signals via audio generator 30 are returned when the part 11 is within (or alternatively not within) the desired measurement range. An in-range condition is determined by microcomputer 40 either from reference detector 5 or from a detector array 4 (e.g. a Reticon 256C) or other equivalent image position detector output (e.g. an analog continuous shuttling barrier type such as the UDT SC-10). Range is determined from the array signal. A suitable photo detector array is a Reticon 1024C linear photodiode array.

The primary intent of this device is to signal an operator 55 manipulating the CMM arm 60 (to which the sensor is attached) when satisfactory data can be read. As long as the detector is within range, an indication (or optionally no indication) is produced. When it begins to get out of range, a warning signal comes on. The data from array 4 is typically combined by microcomputer 40 with sensor position as determined from encoder 61 on member 60 to produce a combined result indicative of part surface position.

Optionally a variable pitch or pulse rate audible signal can be provided by generator 30 under control of microcomputer 40 to indicate that one is getting either closer to the nominal range position or farther away from it for example by decreasing the rate (or frequency) as one gets away from nominal on either side until out of range (where no signal would normally be provided).

Also optional is a light type indicator 50 to indicate that one is within range. A pulsing light signal can indicate one is getting closer or farther away by a change in the pulse rate. This light signal is visible ideally at the end of the sensor (eg. 51) so that the operator can view both the part and the end of the sensor simultaneously.

A change in color of the light source can also be used, e.g. by using red and green LEDs 51 to indicate.

It is noted that the audio signal is generally best for surface contour scanning, since the operator can then look wherever he pleases, concentrating on providing the scanning motion required to keep the sensor within range as it traverses the part surface.

The reference detector whose function and design is well described in references 2 and 3 above, can be used to easily give a simple "in-range" signal. If the reference detector voltage exceeds a threshold, the sensor is in range, assuming the reference detector has a similar field of view to the detector array—i.e. that an image spot hits the reference detector when it also in on the array. (Note that reference detector 5 could be incorporated with array 4, but no array chips now have such built in reference detectors.)

For trend purposes (e.g. going out of range), this data could be derived from the detector array output (distance to part) or by using a modified reference detector as shown in FIG. 2a.

FIG. 2a illustrates two designs of reference detectors (5 and 20) in which the spot image decreases the output of the detector as it approaches the edges of the detector from nominal standoff illustrated schematically by center line 25—i.e. the equivalent out of range condition as on array 4.

Detector 5 illustrates use of graded neutral density filters 101 and 102, with highest attentuation near the detector ends, while the detector 20 is shaped such that portions of the spot image 21 fall off at the ends. In either case, the signal, such as voltage V out of the detector drops as shown in FIG. 2b.

It is noted that the fall off function is provided naturally if the reference detector is typically positioned to receive the same amount of light as the main detector and is relatively narrow. Its signal can be used to give a somewhat range determinate signal, i.e. when light level on the detector is equal or greater than a value, the sensor is in range. Light level decreases on the reference detector when the sensor is away from its nominal standoff (generally the point 21' at which the incident beam is best focused on the part and generally the point 21" where the zone image is best focused on the detector). This is shown in FIG. 2c.

It is noted that the use of reference detectors with variant light level output, however, is difficult as they can confuse the light power control system (unless readings are taken with the system deactivated for the purpose) attempting to maintain constant image spot intensity on the photodetector array, unless steps are taken to control the light power also in concert with range as well as part surface reflectivities considerations.

To obviate these difficulties it is of interest to use a reference detector of the continuous spot position monitoring type, such as a UDT SC-10. These continuous detectors give a light level output (constant over the range) from one port, while providing from a second port a voltage output as shown in FIG. 2d indicative of position of the image zone on its face. This can give even a two axis position indication if desired, although one axis is generally enough.

Such detectors have high frequency response, and can, if desired, be coupled to a machine control to automatically keep a sensor within operating range, freeing the main detector (e.g. a detector array) to take accurate position data.

It is noted that a reference detector itself can be a photodetector array, preferably operating at a higher scan speed than the main detector such that the approximate range and light intensity derived from its output can be used advantagously to control light power, sensor position or main array integration time for example. As an example, a Reticon 128C could be used as the reference with a 17284 used as the main array.

Shown in FIG. 2e is an example of a possible audio output of generator 30 wherein frequency drops off as the sensor approaches the out of range condition (where sound is extinguished). While the reference detector conveniently provides this data, it could be derived from the photodetector array based range data as well. Frequency is constant over a give "good data" range about nominal.

FIG. 3 illustrates an embodiment of the invention for scanning a part;

Triangulation sensor 300 according to the invention is mounted to a moveable member 320 of machine 301 having base 302 where part 305 is located.

Horizontal arm 320 is movable horizontally and said arm position is determined by encoder 308 connected together with sensor 300 to controller 310. Arm 320 generally is movable vertically along a vertical member 330 with vertical location encoded as well (as in the case of member 60 and encoder 61 in FIG. 1).

In operation the operator often follows this procedure. He moves the arm vertically downward until the sensor picks up the part surface at the highest point, eg. point A, and he continues to move the sensor downward until the sensor is nearest the part but still within its useful range. He then locks the vertical axis and moves the sensor arm 320 horizontally to sweep the surface until the sensor starts to go out of range, e.g. at point B, creating a contour plot for example 311, using the sensor output and the horizontal encoder postion.

As the range limit 'B' is reached, the operator lowers the arm 320 on the vertical axis again and continues the scan in the same manner. The computer, if provided, puts the pieces of data from each sweep together if desired.

It is noted that the axes can be motorized, e.g. by motor 321, to allow the arm to automatically scan. A stop can be programmed when the sensor goes of of range, or the vertical axis can be motorized as well.

FIG. 4a illustrates an embodiment of the invention used to provide a visual indication on the part surface 195 itself.

Sensor 200 for example like 6 in FIG. 1, but with a visible laser source, projects a visible laser beam 202 onto part 195.

In the first instance, a light beam projector 205 comprising incandescent bulb 206 is focused by leans 207 to form spot 208 on part 195. The angle $\theta$ is set up so that as long as the operator observes this spot to overlap the main spot of laser beam 202 the sensor is within its operable range.

Where the main beam 202 is invisible, a second visible projector 216, like 205, can be used to project second spot 218 onto the part. The angles 0 and 0 are adjested so that the spots 208 and 218 overlap when the sensor is in range and are separated when out of range, as schematically shown in FIG. 4b.

Possibilities other than overlap are possible, for example holding spots 218 and 208 within same zone. Indeed, as shown schematically in FIG. 4c, a zone of limit lines 220 and 221 or spaced spots can be projected by one of the projector units, such that the laser spot 202 or other line or spot projector indication falls within lines 220 and 221 when the sensor is in range, and to a near or far side from the projector when out of range.

For example, lines 220 and 221 can be projected by putting a suitable 2 slit reticle in front of bulb 206 and spot 202 can be maintained within the lines by the operator to keep the sensor within range.

What is claimed is:

1. An apparatus for providing an in-range control signal for a non-contact distance measuring sensor of a part where the sensor and part are relatively movable comprising:
    a determining means for determining if the measuring sensor is within an operating range thereof, said determining means including
        (a) a light projecting means for projecting a light zone on the part,
        (b) an imaging means for imaging the projected light zone, and (c) a sensing means for sensing a characteristic of the imaged light zone indicative of the measuring sensor being within the operating range thereof; and a signal means for providing an operating signal when said determining means determines that the measuring sensor is within the operating range thereof.

2. An apparatus according to claim 1 wherein said measuring sensor is a triangulation based on electro-optical sensor projecting a zone of light onto a part surface which zone of light serves as the light zone of said light projecting means, and said imaging means is an image sensing detector.

3. An apparatus according to claim 2 wherein said sensing means of said determining means determines the position of said image on said detector.

4. An apparatus according to claim 2 and further including a reference detector means for compensating for light power as a function of light intensity of said image.

5. An apparatus according to claim 2 wherein said sensing means of said determining means includes a comparison means for comparing a detected light intensity of the imaged light zone to a standard.

6. An apparatus according to claim 4 wherein said reference detector means is a detector capable of detecting both light zone intensity and zone image position.

7. An apparatus according to claim 2 and further including a reference detector means for compensating for image sensing integration time of said image sensing detector.

8. An apparatus according to claim 1 including a range means for providing a range signal which is a function of the range of said measuring sensor from the operating range.

9. An apparatus according to claim 8 wherein said range signal changes in frequency pulse rate as a function of range.

10. An apparatus according to claim 8 wherein said range signal is the same over a nominal operating range and changes as the limits of the operating range is approached.

11. An apparatus according to claim 8 wherein said range signal changes in amplitude as a function of range.

12. An apparatus for determining the distance to a part surface comprising:

a triangulation based optical sensor for non-contact determining of the exact distance from said triangulation sensor to the part surface;

a reference detector means for sensing an approximate distance of said triangulation sensor to the part surface, said reference detector means including (a) a light projecting means for projecting a light zone on the part surface, (b) an imaging means for imaging the projected light zone, and (c) a sensing means for sensing a characteristic of the imaged light zone indicative of the approximate distance of said triangulation sensor to the part surface; and a signal means for providing an operating signal when the approximate distance determined by said reference detector means is within an operating range of said triangulation sensor.

13. An apparatus according to claim 12 wherein said senseing means senses an intensity of the projected light zone and the distance operating signal is produced by the light intensity sensed by said sensing means.

14. An apparatus according to claim 13 wherein said light projecting means includes a light power control means for controlling an intensity of the projected light zone of said triangulation sensor which light power control means is momentarily deactivated by said reference detector means during sensing by said sensing means.

15. An apparatus according to claim 12 wherein said reference detector means detects light intensity and second characteristic of the imaged light zone, which said second characteristic is used to determine the approximate distance and which said light intensity is used to control an operating parameter of said triangulation sensor.

16. An apparatus according to claim 15 wherein said imaging means is a continuous analog type detector.

* * * * *